Aug. 11, 1959     R. L. CURTIS ET AL     2,899,235
FOLDING VAN BODY
Filed June 11, 1958     3 Sheets-Sheet 3
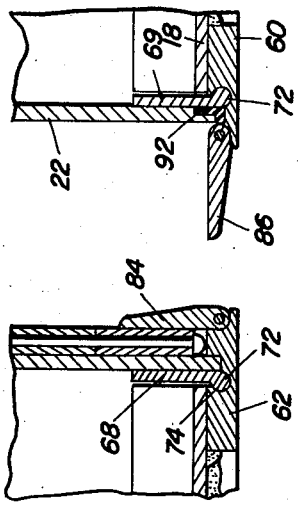
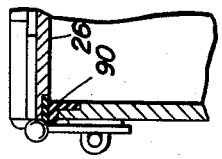
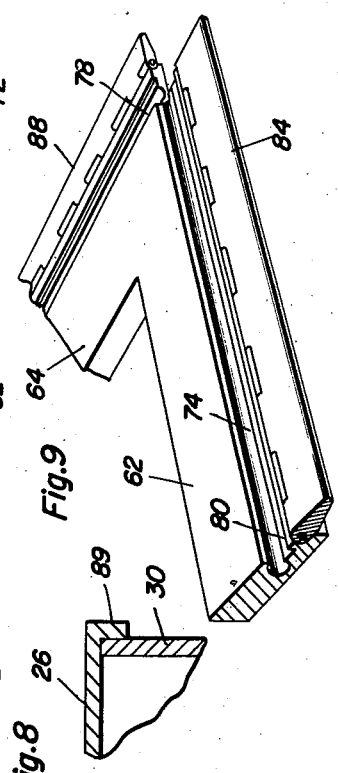
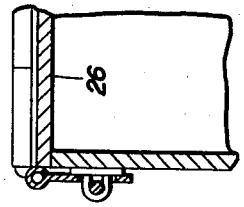
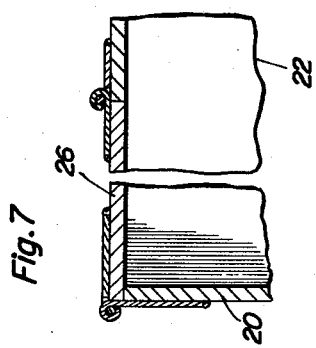
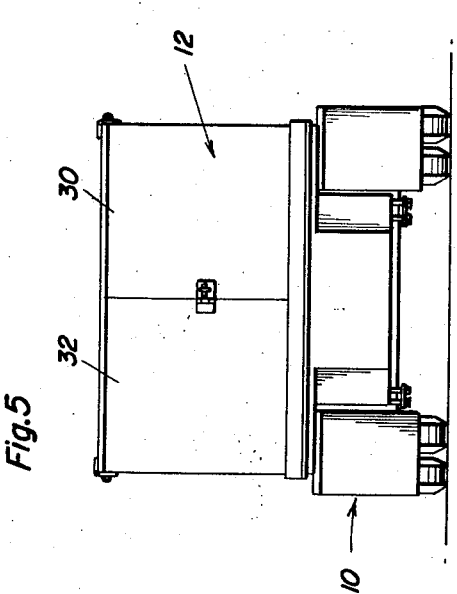
Robert L. Curtis
Arney L. Curtis
    INVENTOR.
BY
    Attorneys United States Patent Office 2,899,235
Patented Aug. 11, 1959

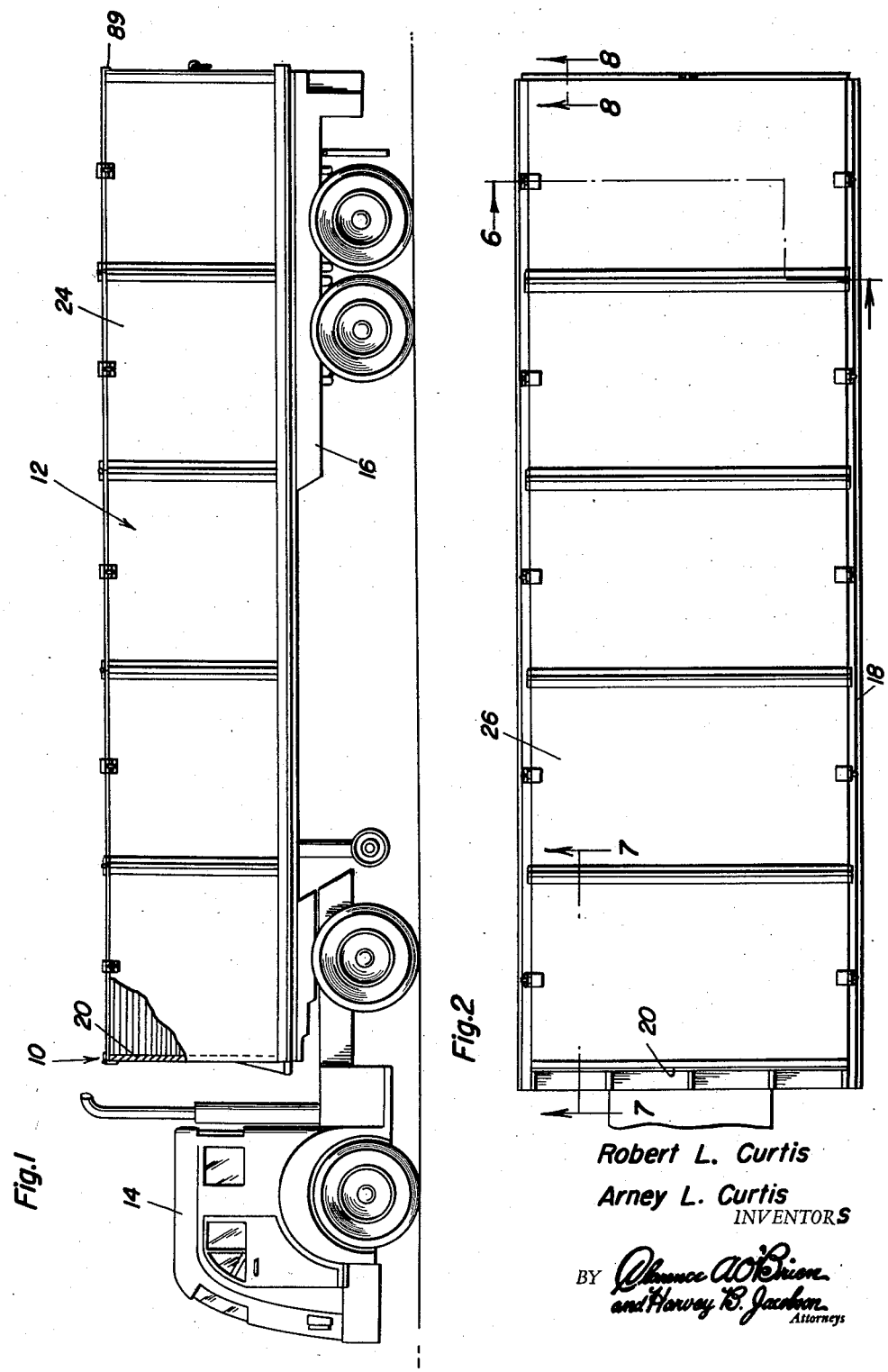
Robert L. Curtis
Arney L. Curtis
INVENTORS

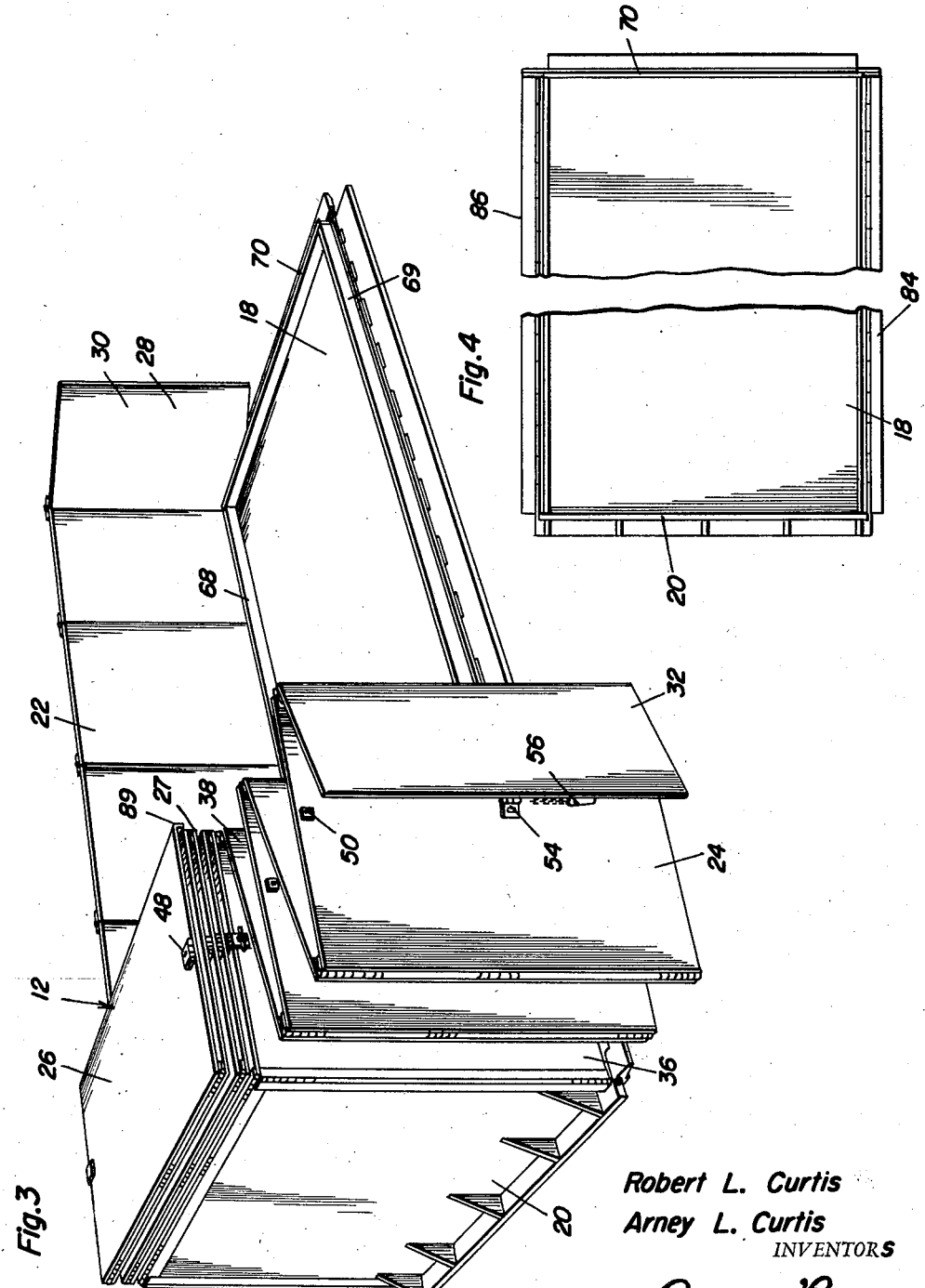

2,899,235
FOLDING VAN BODY

Robert L. Curtis and Arney L. Curtis, John Day, Oreg.

Application June 11, 1958, Serial No. 741,304

6 Claims. (Cl. 296—27)

This invention relates to vehicle bodies and more particularly to a folding body for a van to protect motor truck loads.

The invention is embodied in a collapsible, folding enclosure for the bed of a truck. The enclosure is constructed of top and side panels that are hinged to be extended along the sides, rear and over the top of the load. The panels are hinged from a permanent or fixed headboard positioned at the front of the truck or trailer bed. As used herein, the term "truck" is intended to include all vehicles capable of transporting a load. There are numerous types of trucks and trailers, each of which is well suited to practice the principles of the invention.

The usual means of protecting motor truck loads from weather is in a fixed van type body or by flexible material such as canvas or plastic sheeting wrapped about the load. The fixed van type protection is not desirable in cases where the trailer is transported on the truck when empty, and in cases where the nature of the load prohibits loading to the usual fixed van openings, but must be loaded with lift trucks, etc.

In the lumber and building material industry, the usual type of protection afforded motor truck loads is with canvas or plastic sheeting tied around the load. This type of load protection is not desirable for several reasons as follows:

The material is expensive for the reason that it is of short life by reason of exposure and the frictions involved in exposure en route.

It is inadequate in that it does not prevent the entry of moisture and dirts, and at least in the lumber business there is always a portion of the load damaged by weather, even when shrouded in canvas.

When wet, canvas is very heavy, thus detracting from the pay load that might be transported.

The time involved in shrouding loads with the sheeting material is vastly greater than would be the case when a folding metal type van such as described herein is applied.

The panels of the invention are light in weight, for instance they may be constructed of aluminum or an aluminum alloy. The enclosure may be used to protect any type of load, for instance, lumber, produce, building material, and especially anhydrous loads such as cement where it is essential that the load be dry.

A more specific object of the invention is to provide a new truck body that features a novel enclosure having a plurality of side and top panels that are hinged together so that they can be folded to any length not only depending on the size of the truck bed but also depending on the size of load carried thereon. It is preferred that certain of the panels be used as the end wall of the enclosure and these can be hinged to an open position to form a door.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is an elevational side view of a typical tractor-trailer combination that would be fitted with an enclosure exemplifying the invention.

Figure 2 is a top view of the tractor-trailer of Figure 1.

Figure 3 is a perspective view of the enclosure and bed of a typical truck or trailer that has need and use for an enclosure of the invention.

Figure 4 is a fragmentary top view with the top removed, showing the sides of the enclosure.

Figure 5 is a rear view of the equipment in Figure 1.

Figure 6 is a transverse sectional view taken approximately on the line 6—6 of Figure 2.

Figure 7 is a fragmentary detail showing the hinge construction and taken on the line 7—7 of Figure 2.

Figure 8 is a sectional view showing another detail and taken on the line 8—8 of Figure 2.

Figure 9 is a fragmentary perspective view showing the means for locking the panels in place when they are in the extended position.

Figure 10 is an enlarged sectional view showing a modification to the extent of including rubber seals along some of the confronting edges of the panels.

In the accompanying drawings there is a typical truck 10 with which the folding enclosure 12 is operatively connected. Truck 10 has a tractor 14 and a trailer 16, although, as indicated previously, various types of conventional trucks can use enclosure 12 to protect the loads thereon. Regardless of the type of truck involved, there is a load supporting bed 18, and the enclosure provides a fixed headboard 20 attached to the front end of the bed 18 and rising vertically therefrom. The enclosure 12 has two foldable sides 22 and 24 together with a foldable top 26 and a rear end wall 28 constructed of two panels 30 and 32 at the end of sides 22 and 24.

Side 24 includes a plurality of panels that are preferably but not necessarily, of rectangular shape and which are made of lightweight material. Panel 36 of side 24 is the first panel and is connected by a lock to headboard 20. The second panel 38 is attached to one of the edges of panel 36 by a piano hinge or a plurality of hinges so that the second panel 38 can be folded as shown in Figure 3, with respect to panel 36. A typical hinge 40 is shown in Figure 6. It is made of interdigitated hinge butts 42 and a hinge pin 44 passed through all of the hinge butts. Side 22 is constructed in the same way, as is the top 26.

There are means for locking the panels in the extended position. These means consists of a hasp on each lateral edge of each top panel, for instance hasp 48 (Figure 3) and a keeper 50 along the upper edge of each side panel. When the hasp is engaged with its keeper for each group of panels, a locking pin can be engaged with the hasp and keepers of each group to separably hold the top panel fastened to two of the side panels of each group, consisting of one of the top panels and one side panel for each side 22 and 24 of the enclosure, being fastened together provides a reasonably rigid enclosure for a load thereunder that would be located on the bed 18. End panels 30 and 32 have a suitable latch, for instance latch 54 constructed of a hasp and keeper together with locking pin 56, to hold the end wall panels 30 and 32 in fixed position but yet enable them to be opened.

The truck bed 18 is of special construction to hold the lower edges of the sides and end wall of the enclosure. Longitudinal stringers 60 and 62 are at the side edges of bed 18 and there is a transverse stringer 64 at the rear end of the bed. Short upstanding flat supports 68, 69 and 70 have beads 72 at their lower edges and are located in grooves 74 and 76 and 78 formed in the stringers and opening upwardly. If the beads are made generally circular in cross-section, as shown, the grooves that accept the beads will be of similar shape. If the shape of the beads is varied, the groove shape is correspondingly changed. The supports form an abutment for the lower edges of the sides and rear wall of the enclosure. These lower edges fit flush against the supports and are located on seats 80 formed by a small ledge adjacent to the grooves.

The means for locking the panels of the sides and rear wall in place including also locking strips 84, 86 and 88 along the two sides and rear of the stringers 62, 60 and 64 respectively. The strips are connected by hinges to the stringers and are adapted to be swung up (right side of Figure 6) to a position where they contact the lower portions of the outer surfaces of the panels and clamp against them. The locking strips and supports form upwardly opening pockets within which the panels of the sides and rear wall of the enclosure are held fastened in place. The locking strips can be held in position of engagement with the sides and rear wall of the enclosure by latches, hasp and keepers or other standard locking hardware.

When the top of the enclosure is in the full open position, downturned lip 89 on the end panel of the top overlies the upper edge portion of the panels 30 and 32 to rigidify the enclosure. To open the rear panels, it is necessary only to lift the end panel 26 of the top and then hingedly operate the end panels. Hinges 27 which connect the confronting edges of the panels 26 are of the type enabling the panels of the top to fold to a compact position in an accordion fashion. The same holds true for the sides 22 and 24.

In instances where moisture proofing is desirable, upper and lower rubber seals 90 and 92 can be attached to the adjacent edges of the panels that make up the sides and top of the enclosure. The rubber seals can be of any type and fastened in place in any way, for instance by cementing and/or the use of fasteners. Seals will be required in other places for a completely moisture tight construction.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equipvalents may be resorted to, falling within the scope of the invention as claimed.

What is claimed as new is as follows:

1. A folding enclosure for a truck or the like, said folding enclosure comprising sides and a top for the bed of the truck, each side consisting of a plurality of panels, means hingedly connecting confronting edges of said panels, means hingedly connecting the confronting edges of the panels of the top, and means connected with the bed of the truck for clamping releasably the lower edges of said sides to hold the enclosure rigidly attached to the bed, said means clamping the lower panels of the sides including upstanding supports against which the lower edges of the side panels are adapted to engage, locking strips hingedly movable to a position contacting the outer surfaces of the lower parts of the panels of said sides and thereby forming an upwardly opening clamp for each side.

2. The enclosure of claim 1 wherein said locking strips and supports are spaced from each other, a stringer to which each pair consisting of one support and one locking strip is connected, a seat on each stringer on which the lower edge of each side panel is disposed.

3. The enclosure of claim 1 wherein said locking strips and supports are spaced from each other, a stringer to which each pair consisting of one support and one locking strip is connected, a seat on each stringer on which the lower edge of each side panel is disposed, and seals on said seat and at the upper edges of said side panels on which the outer edges of the panels of said top are adapted to seat.

4. In a portable, foldable enclosure for a truck, sides, a top and a rear wall, said sides, said top and said rear wall constructed of a plurality of hingedly connected panels that are adapted to fold between the storage position and the extended load enclosing position, locking means connected with said panels to lock the panels of said top to the panels of said sides and thereby hold said sides and top in the load protecting position, means forming upwardly opening pockets for embracing and engaging the lower edges of the panels of said sides and thereby rigidifying the sides of the enclosure when in the load protecting position, each pocket constructed of a stringer with a seat to support the lower edges of the side panels, a movable locking strip adapted to engage one surface of the panels of said sides and a support adapted to contact the opposite surface of said panels of said sides.

5. The enclosure of claim 4 wherein two of said panels constitute said end wall of the enclosure, and means connected with said end wall to releasably hold said end wall rigid with said sides.

6. A folding enclosure for a truck or the like, said folding enclosure comprising sides for the bed of the truck, each side consisting of a plurality of panels, means hingedly connecting confronting edges of said panels, and means connected with the bed of the truck for clamping releasably the lower edges of said sides to hold the enclosure rigidly attached to the bed, said means clamping the lower panels of the sides including upstanding supports against which the lower edges of the side panels are adapted to engage, locking strips hingedly movable to a position contacting the outer surfaces of the lower parts of the panels of said sides and thereby forming an upwardly opening clamp for each side.

References Cited in the file of this patent
UNITED STATES PATENTS

| | | |
|---|---|---|
| 1,405,485 | Callery | Feb. 7, 1922 |
| 2,011,965 | Ball | Aug. 20, 1935 |
| 2,555,942 | Supplee | June 5, 1951 |
| 2,771,319 | Renquist | Nov. 20, 1956 |
| 2,793,067 | Couse | May 21, 1957 |